United States Patent
Lee et al.

(10) Patent No.: US 7,851,960 B2
(45) Date of Patent: Dec. 14, 2010

(54) SYNCHRONOUS RELUCTANCE MOTOR

(75) Inventors: Kyung Hoon Lee, Seoul (KR); Jun Ho Ahn, Seoul (KR)

(73) Assignee: LG Electronics Inc., Seoul (KR)

( * ) Notice: Subject to any disclaimer, the term of this patent is extended or adjusted under 35 U.S.C. 154(b) by 354 days.

(21) Appl. No.: 11/943,178

(22) Filed: Nov. 20, 2007

(65) Prior Publication Data

US 2008/0296991 A1    Dec. 4, 2008

(30) Foreign Application Priority Data

May 31, 2007    (KR) .................. 10-2007-0053342

(51) Int. Cl.
*H02K 19/00* (2006.01)
(52) U.S. Cl. .............. 310/162; 310/156.53; 310/156.57
(58) Field of Classification Search ................. 310/162, 310/156.53–156.58, 216.114–216.133
See application file for complete search history.

(56) References Cited

U.S. PATENT DOCUMENTS

| | | | | |
|---|---|---|---|---|
| 4,476,408 A | * | 10/1984 | Honsinger | ............. 310/156.84 |
| 6,769,167 B2 | * | 8/2004 | Lee et al. | ....................... 29/596 |
| 6,836,045 B2 | * | 12/2004 | Murakami et al. | ...... 310/156.53 |
| 6,849,983 B2 | * | 2/2005 | Tajima et al. | ............... 310/166 |
| 7,560,846 B2 | * | 7/2009 | Lee et al. | .............. 310/216.004 |
| 2002/0175583 A1 | * | 11/2002 | Kikuchi et al. | ......... 310/156.56 |
| 2002/0175584 A1 | * | 11/2002 | Koharagi et al. | ........ 310/156.56 |
| 2006/0043812 A1 | * | 3/2006 | Cheong et al. | ......... 310/156.53 |
| 2007/0247012 A1 | * | 10/2007 | Shin et al. | .............. 310/156.06 |

\* cited by examiner

*Primary Examiner*—Thanh Lam
(74) *Attorney, Agent, or Firm*—Fish & Richardson P.C.

(57) ABSTRACT

A synchronous reluctance motor is described. The synchronous reluctance motor includes a core configured to rotate about a central axis and having first and second groups of flux barriers formed therein. Each flux barrier is defined as an opening in the core. Each of the first and second groups includes a first flux barrier and a second flux barrier with the second flux barrier disposed outside the first flux barrier in a radial direction from the central axis of the core. Each of the second flux barriers of the first and second groups has at least two connection parts crossing the opening of the second flux barrier.

7 Claims, 7 Drawing Sheets

SYNCHRONOUS RELUCTANCE MOTOR

This application claims the benefit of Korean Patent Application No. 10-2007-0053342, filed on May 31, 2007, which is incorporated by reference in its entirety.

BACKGROUND

1. Technical Field

This document relates to a synchronous reluctance motor.

2. Description of the Related Art

In general, a synchronous reluctance motor is a motor for generating a rotary force by a variation of magnetic resistance caused by a rotation of a rotor. The synchronous reluctance motor is widely used, for example, in a compressor. A rotor of the synchronous reluctance motor includes a core having laminated steel sheets. Each steel sheet of the core has flux barriers and a steel part, where the flux barriers may comprise voids in the steel part.

If the rotor is activated, the flux barrier interferes with a flow of flux, which causes a difference of magnetic resistances between a "q" axis directing to the flux barrier and a "d" axis directing between respective flux barrier groups in a circumferential direction of the rotor. The difference of magnetic resistances between the "q" axis and the "d" axis generates reluctance torque. The reluctance torque is synchronized with the flux of a stator and therefore, the reluctance torque is more dominant than the inductive torque by the flux barrier. Thus, the rotor is rotated at synchronous speed by the reluctance torque.

In the conventional synchronous reluctance motor, stress caused by the centrifugal force is concentrated around the outer side of the core, specifically, in both side ribs of the flux barrier, thereby causing a deformation of the outer side of the core.

SUMMARY

In one general aspect, a synchronous reluctance motor is configured to decentralize a stress concentrated in an outer side of a core at the time of rotating a rotor at high speed, so as to improve a mechanical rigidity of the core. The synchronous reluctance motor includes a core configured to rotate about a central axis and having first and second groups of flux barriers formed therein. Each flux barrier is defined as an opening in the core. Each of the first and second groups includes a first flux barrier and a second flux barrier with the second flux barrier disposed outside the first flux barrier in a radial direction from the central axis of the core. Each of the second flux barriers of the first and second groups has at least two connection parts crossing the opening of the second flux barrier.

In another general aspect, a synchronous reluctance motor includes a core configured to rotate about a central axis and having first and second groups of flux barriers formed therein. Each flux barrier is defined as an opening in the core and each of the first and second groups includes a first flux barrier and a second flux barrier with the second flux barrier disposed outside the first flux barrier in a radial direction from the central axis of the core. The synchronous reluctance motor also includes an end plate disposed at one end of the core and a pin passing through the core and mechanically coupled to the end plate. The distance between the pin and the central axis of the core is greater than the distance between one of the second flux barriers and the central axis of the core.

In yet another general aspect, a synchronous reluctance motor includes a core with a flux barrier formed therein with the flux barrier dividing the core into an inner part and an outer part. The synchronous reluctance motor also includes an end plate disposed at one end of the core and a fixing member passing through the flux barrier and mechanically coupled to the end plate and the core.

Implementations may include one or more of the following features. For example, each of the connection parts may have a width of 0.3 mm to 0.7 mm. The core may be made of steel. The fixing member may pass through one of the second flux barriers. The fixing member may include a protrusion and the outer part of the core may include a groove to receive the protrusion of the fixing member. The connection parts in the second flux barrier through which the fixing member passes may be symmetrically disposed with respect to the fixing member. The fixing member may be a rivet and the pin may be a magnetic body.

The distance between one of the connection parts and the central axis of the core may be greater than the distance between the fixing member and the central axis of the core. Also, the distance between the pin and the central axis of the core may be greater than the distance between the central axis of the core and the fixing member.

Other features and advantages will be apparent from the following description, including the drawings and the claims.

DETAILED DESCRIPTION

Figure 1:
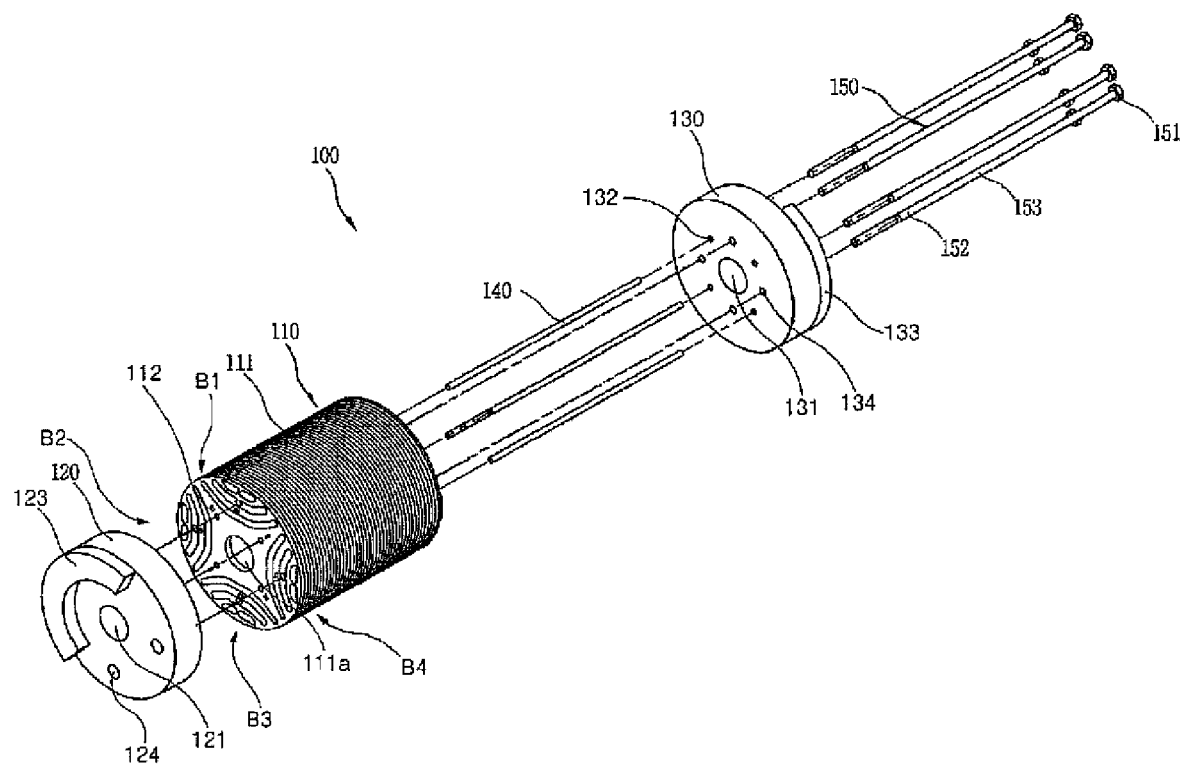
FIG. 1 is an exploded perspective view of a rotor of a synchronous reluctance motor.
Figure 2:
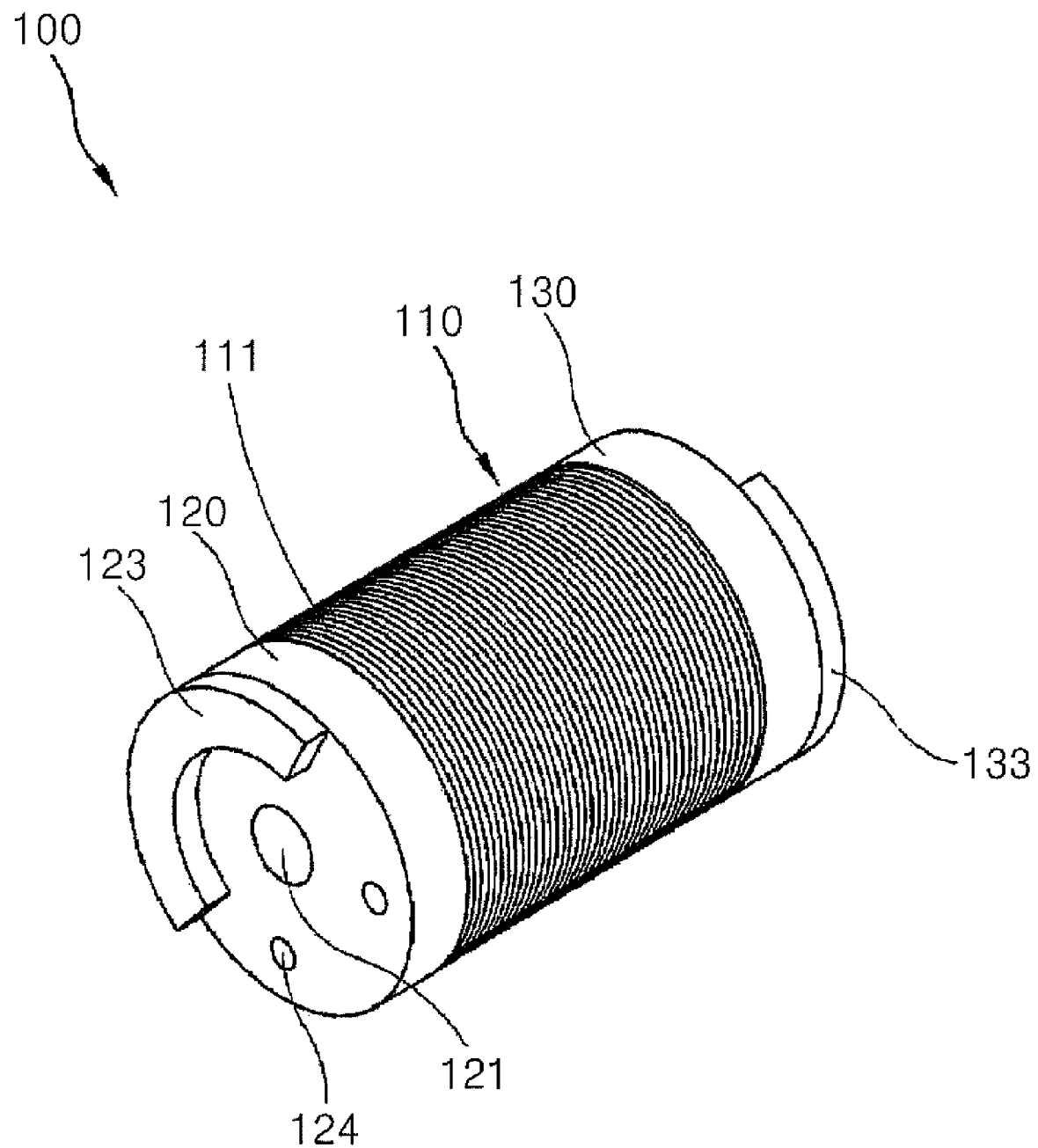
FIG. 2 is a perspective view of the rotor of the synchronous reluctance motor shown in FIG. 1.

FIG. 1 is an exploded perspective view of a rotor of a synchronous reluctance motor and FIG. 2 is a perspective view of the assembled rotor of the synchronous reluctance motor shown in FIG. 1.

Referring to FIGS. 1 and 2, the rotor 100 of the synchronous reluctance motor includes the core 110, end plates 120 and 130 disposed at each side surface of the core 110, and a fixing member 150 for fixing the core 110 and the end plates 120 and 130.

The core 110 is a laminate core formed by laminating steel sheets 111. The steel sheet 111 is, for example, a silicon steel sheet. The core 110 has a shaft hole 111a at its center.

Figure 3:
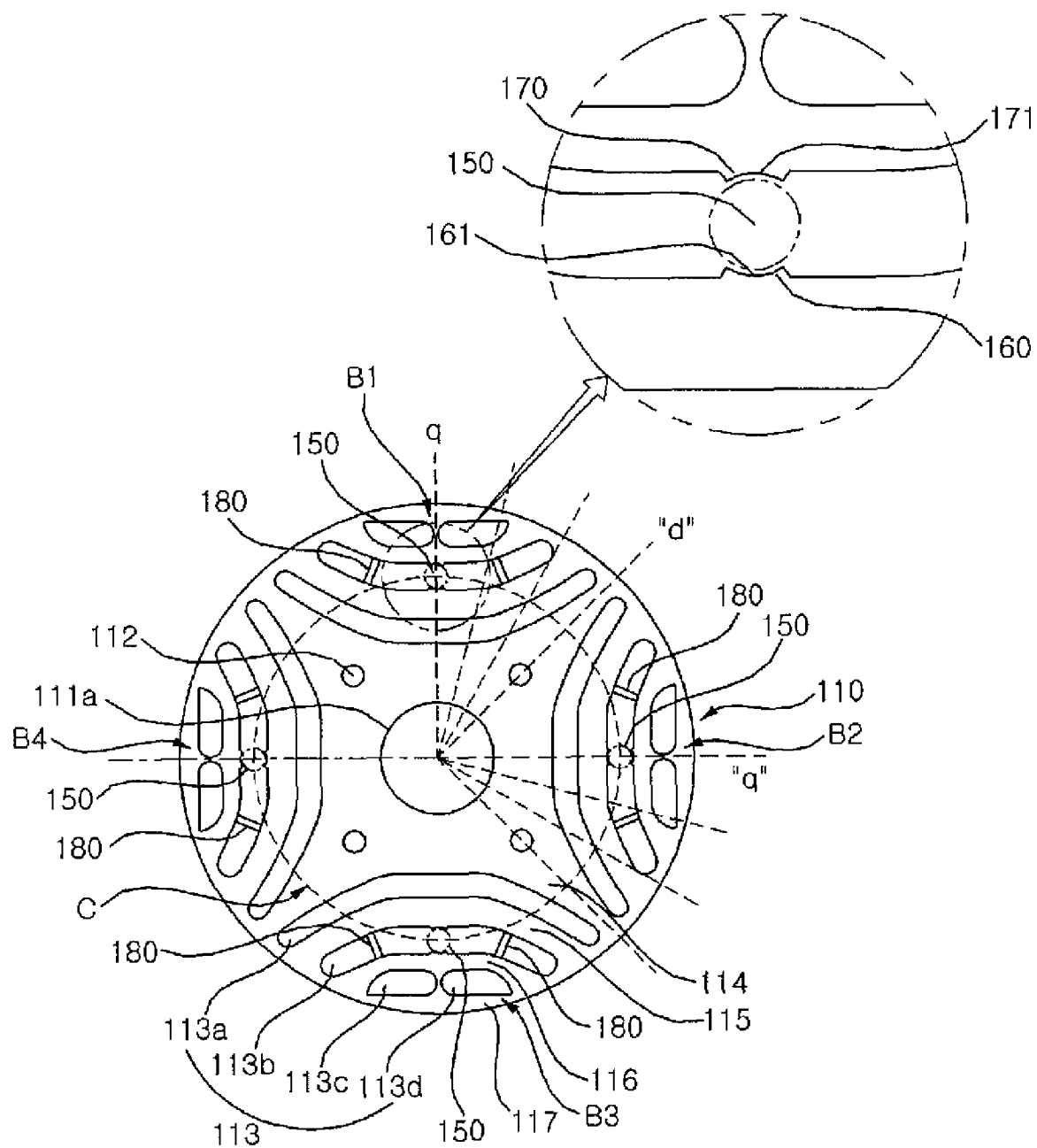
FIG. 3 is a plan view of a rotor core of a synchronous reluctance motor in one implementation.

FIG. 3 is a plan view of a rotor core of a synchronous reluctance motor in one implementation. Referring to FIG. 3, the core 110 has flux barriers 113 and steel parts 114, 115, 116, and 117.

The flux barriers 113 may be formed, for example, by machine-pressing the steel sheets of the core 110. The flux barriers 113 may be formed in regions that are equally spaced around the center of the silicon steel sheet 111. At each of the regions, four flux barriers 113a, 113b, 113c, and 113d are formed.

Referring to FIG. 3, four flux barrier groups B1, B2, B3, and B4 are formed in the regions that are separated by an angle of 90° around the center of the core 110. Each of the flux barrier groups B1, B2, B3, and B4 has four flux barriers 113a, 113b, 113c, and 113d. The number and shape of the flux barriers and the flux barrier groups may vary according to a characteristic of a motor.

Among the flux barriers 113a, 113b, 113c, and 113d, the flux barriers 113a and 113b are of a circular arc shape in which both ends are provided to be in proximity with the circumference of the silicon steel sheet 111 and central part protrudes toward the shaft hole 111a at the center.

Referring to FIGS. 1 and 2, the end plates 120 and 130 are disposed at both side surfaces of the core 110 and are fixed to the core 110. The end plates 120 and 130 have shaft holes 121 and 131. The shaft holes 121 and 131 are provided at the centers and communicate with the shaft hole 111a of the core 110.

The core 110 has pin holes 112 provided between the flux barrier groups B1, B2, B3, and B4. Pins 140 are inserted into the pinholes 112. The end of each pin 140 is fitted into or passes through a pin fixing groove 132 of at least one of the end plates 120 and 130.

When the core 110 is assembled, the pin 140 serves to align the silicon steel sheets 111 and serves to increase a coupling force between the core 110 and the end plates 120 and 130.

The end plates 120 and 130 include balance weights 123 and 133 to prevent the eccentricity of the rotor 100. The size of the balance weights 123 and 133 may vary depending on the motor capacity.

Coupling holes 124 and 134 are provided around the shaft holes 121 and 131 of the end plates 120 and 130. The coupling holes 124 and 134 provide passage for the fixing members 150. In one implementation, the fixing member 150 is a rivet having a body 153, a head 151, and an end 152.

Referring to FIG. 3, the fixing members 150 are installed to pass through at least one of the flux barriers 113a, 113b, 113c, and 113d of flux barrier groups B1, B2, B3, and B4. Specifically, the fixing member 150 is installed to pass through the flux barrier 113b in the middle of the flux barrier 113b. Two supports 160 and 170 are formed to face with each other at the central flux barrier 113b. The supports 160 and 170 have arc shaped mount grooves 161 and 171, respectively, to accommodate the body 153 of the fixing member 150. The head 151 and end 152 of the fixing member 150 are firmly coupled to the end plates 120 and 130.

When the rotor 100 is rotated at high speed, the core 110 is subjected to a centrifugal force in a radial direction. The fixing member 150 passing through the flux barrier 113b and firmly coupled to the end plates 120 and 130 supports, for example, steel part 115, thereby preventing the deformation of the core 110.

In some implementations, the end plates 120 and 130, guide pins 140, and the fixing members 150 are made of non-magnetic material to prevent a leakage of flux through a flux path and thus are magnetically independent of the core 110.

When the rotor 100 is rotated at high speed, the core 110 is subjected to a stress in a radial by the centrifugal force. In such a case, as described above, the fixing member 150 supports the steel part 115, thereby preventing the deformation of the core 110.

However, the fixing member 150 does not support the steel parts 116 and 117. Therefore, the stress due to the centrifugal force is concentrated around both ends of the flux barrier 113b.

Figure 4:
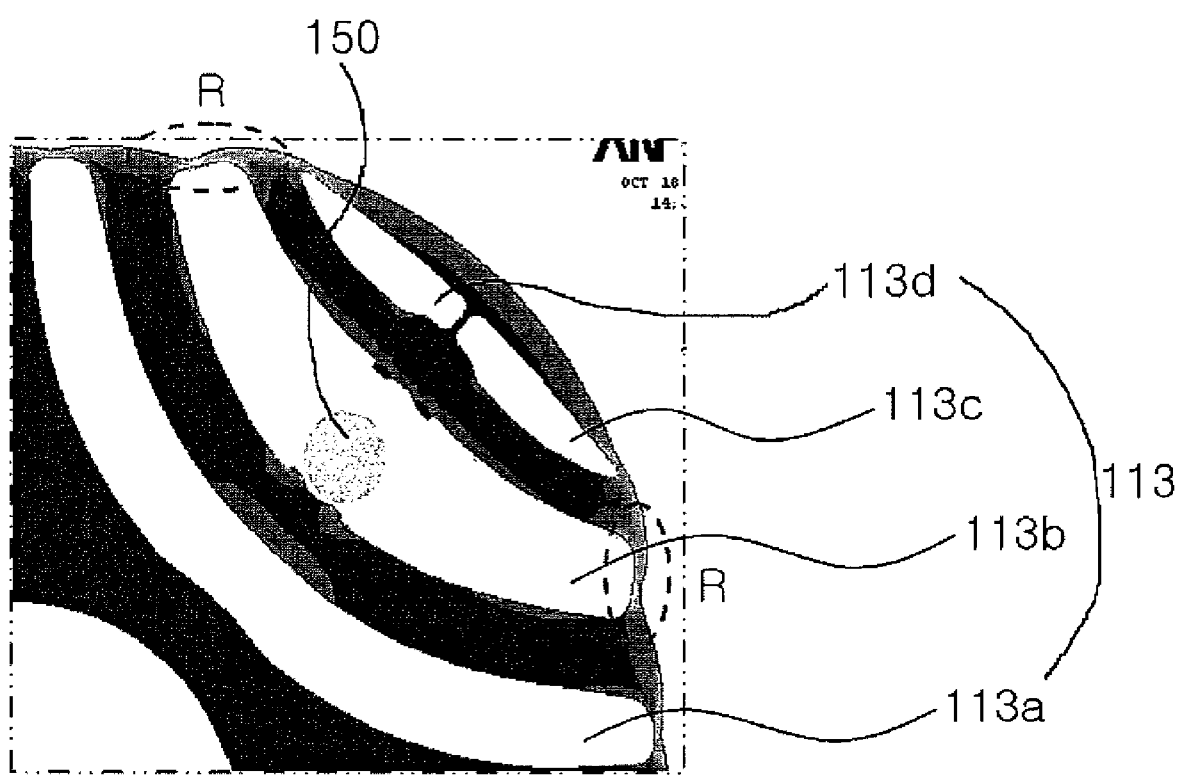
FIG. 4 is a diagram illustrating a degree of deformation of an outer side of a rotating core without reinforcement.

FIG. 4 is a diagram illustrating the degree of deformation near the ends of the flux barrier 113b. As shown in FIG. 4, the stress due to the centrifugal force is concentrated around both sides of ribs (R) of the flux barrier 113b.

FIG. 3 illustrates a virtual circle (C) having a center at the center of the core 110 and passing through the fixing members 150. The fixing members 150 can support portions of the core inside the virtual circle (c) but cannot support portions of the core outside the virtual circle (c), resulting in the deformation near the ends of the flux barrier 113b, as shown in FIG. 4.

In some implementations, reinforcement is provided to support portions of the core when the core rotates at high speed. Referring to FIG. 3, in order to support portions of the core 110 outside the virtual circle (c), the reinforcement is provided in the form of a connection parts 180 formed at the flux barrier 113b and connecting steel parts 115 and 116.

The connection part 180 is formed to cross the flux barrier 113b so that it connects between the steel part 115 positioned at an outer side of the flux barrier 113b in the core 110 and the steel part 116 positioned at an inner side of the flux barrier 113b.

The connection part 180 is disposed at the flux barrier 113b where the fixing member 150 is installed. Referring to FIG. 3, the fixing member 150 is installed at the central flux barrier 113b among the plurality of flux barriers 113a, 113b, 113c, and 113d. Large stress is concentrated around both side ribs (R) of the central flux barrier 113b (shown in FIG. 4). Therefore, it is desirable that the connection part 180 is formed to connect the steel parts 115 and 116 across the central flux barrier 113b in order to reinforce the structure against the stress.

The connection parts 180 are formed to extend from the steel parts 115 and 116 and may have the same material as the steel parts 115 and 116. The connection parts 180 each are disposed one by one in symmetry with respect to the fixing member 150.

As the connection parts 180 increase in number, the core 110 can be better reinforced. But, the connection part 180, which is a magnetic body having the same material as the steel parts 115 and 116, may also cause leakage of flux through a flux path and thus, may reduce the efficiency of the motor. Therefore, in determining the number and width of the connection parts 180, a trade-off should be made between the degree of reinforcement and the flux leakage. For example, the width of the connection part 180 may be within a range of 0.3 mm to 0.7 mm to minimize the influence on the pattern of the flux and optimize an effect of stress decentralization.

FIG. 3 illustrates "d" axis and a "q" in the core 110. The "d" axis extends from the center of the core 110 in the radial direction and passes between the respective flux barrier groups B1, B2, B3, and B4. That is, the "d" axis is a line between the center of the core 110 and a space between the respective flux barrier groups B1, B2, B3, and B4. The "q" axis extends from the center of the core 110 to a center of the fixing member 150. That is, the "q" axis is a line between the center of the core 110 and the center of the fixing member 150. The connection part 180 is formed in the middle region among the regions trisecting the angle between the adjacent "d" axis and "q" axis.

In detail, as shown in FIG. 3, in the core 110, the "d" axis and the "q" axis are provided in each region equally divided at an angle of 90°. The connection part 180 can be formed in the middle region among the regions trisecting the angle between the adjacent "d" axis and "q" axis. Specifically, it is desirable that the connection part 180 is formed near a bisector bisecting the angle between the adjacent "d" axis and "q" axis.

Figure 5:
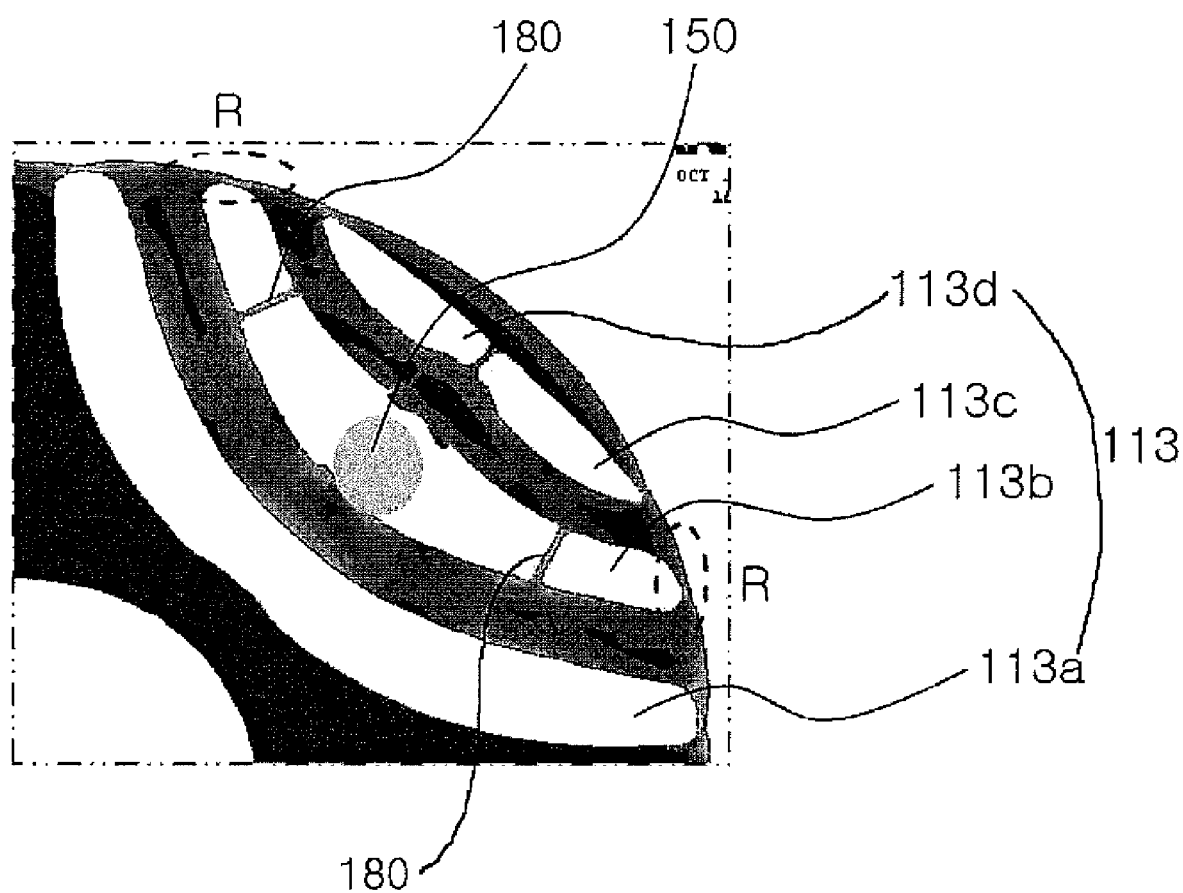
FIG. 5 is a diagram illustrating a degree of deformation of an outer side of a rotating core having reinforcement.

This is because in case where the connection part 180 is formed close to the fixing member 150 or to the outer rib (R) of the core 110, the reinforcement effect against the centrifugal force inflicted on the outer rib (R) of the core 110 reduces. Therefore, the connection part 180 is formed near the bisector approximately bisecting the angle between the "d" axis and the "q" axis FIGS. 4 and 5 illustrate a degree of deformation of the outer side of the core when the rotor is rotated at a high speed of 120 Hz. FIGS. 4 and 5 compares the degrees of deformation between when the connection part 180 is used and not. When the connection part is not formed as shown in FIG. 4, the measured maximum stress applied to the outer rib (R) of the core 110 is about 191.9 MPa, and the degree of deformation of the outer rib (R) of the core 110 is about 15.6 μm. Here, the deformation degree represents an extent that the outer rib (R) is deformed at an outer side compared to a case when the core 110 is not rotating.

When the connection part 180 is formed as shown in FIG. 5, the measured maximum stress applied to the outer rib (R) of the core 110 is about 97.6 MPa, and the degree of deformation of the outer rib (R) of the core 110 is about 6.9 μm. Thus, the addition of the connection part 180 shows 50.9% reduction of maximum stress and 44.2% reduction of deformation.

Figure 6:
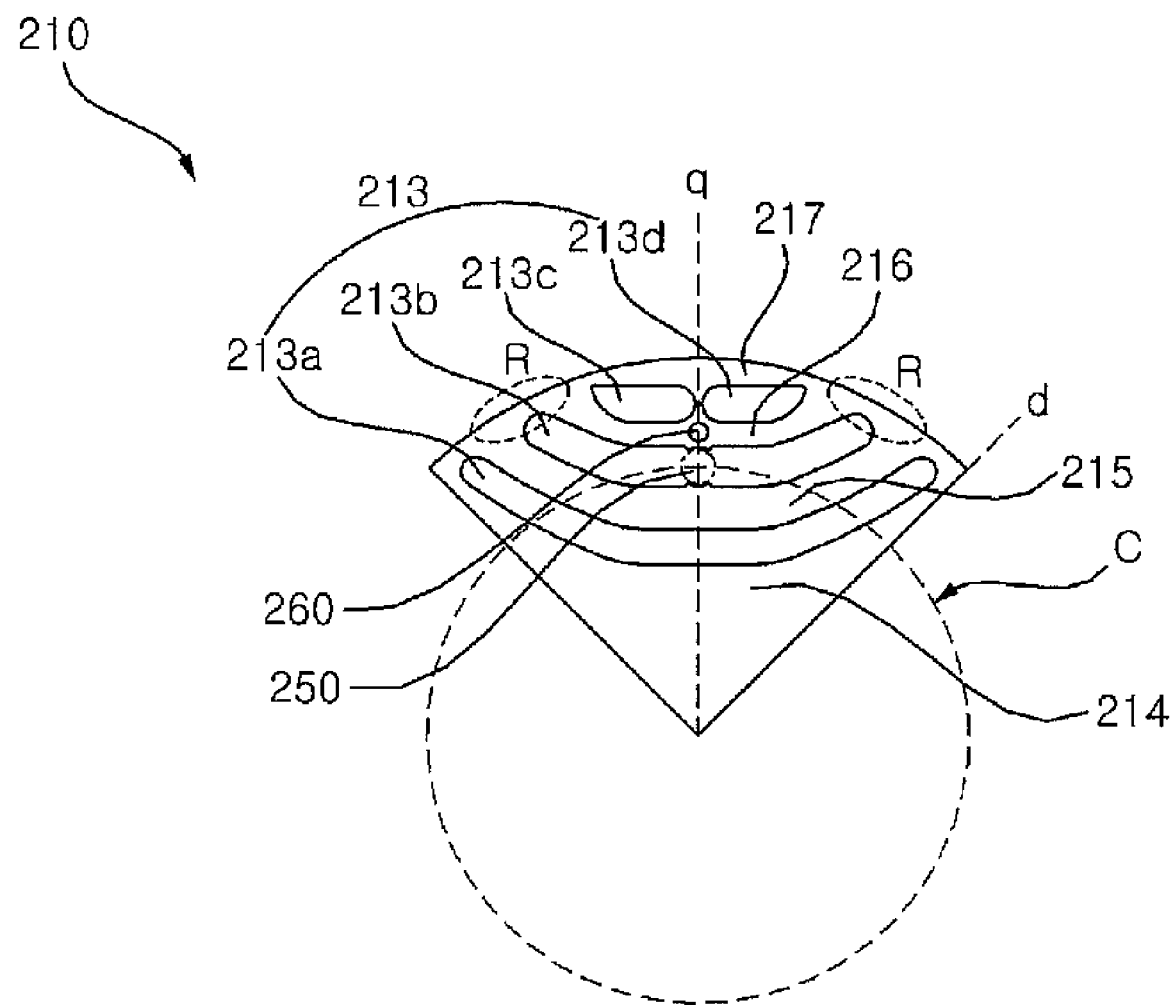
FIG. 6 is a plan view of a rotor of a synchronous reluctance motor in another implementation.

FIG. 6 is a plan view of a rotor of a synchronous reluctance motor in another implementation. In FIG. 6, the reinforcement against the centrifugal force is provided in the form of a pin 260 passing through a core 210. The pin 260 is made of a magnetic material to allow a passage of flux.

The pin 260 is inserted to the steel part 216. The steel part 216 is positioned outside the flux barrier 213b where a fixing member 250 is installed. The pin 260 is coupled at its both ends to end plates, for example, the end plates 120 and 130 in FIGS. 1 and 2. Accordingly, when the rotor is rotated at high speed, the pin 260 supports the portions of the core 210 outside of the fixing member 250 against the centrifugal force, thereby reducing a deformation of the outer side of the core 210, specifically, a deformation of a rib (R) part outside the core 210.

Figure 7:
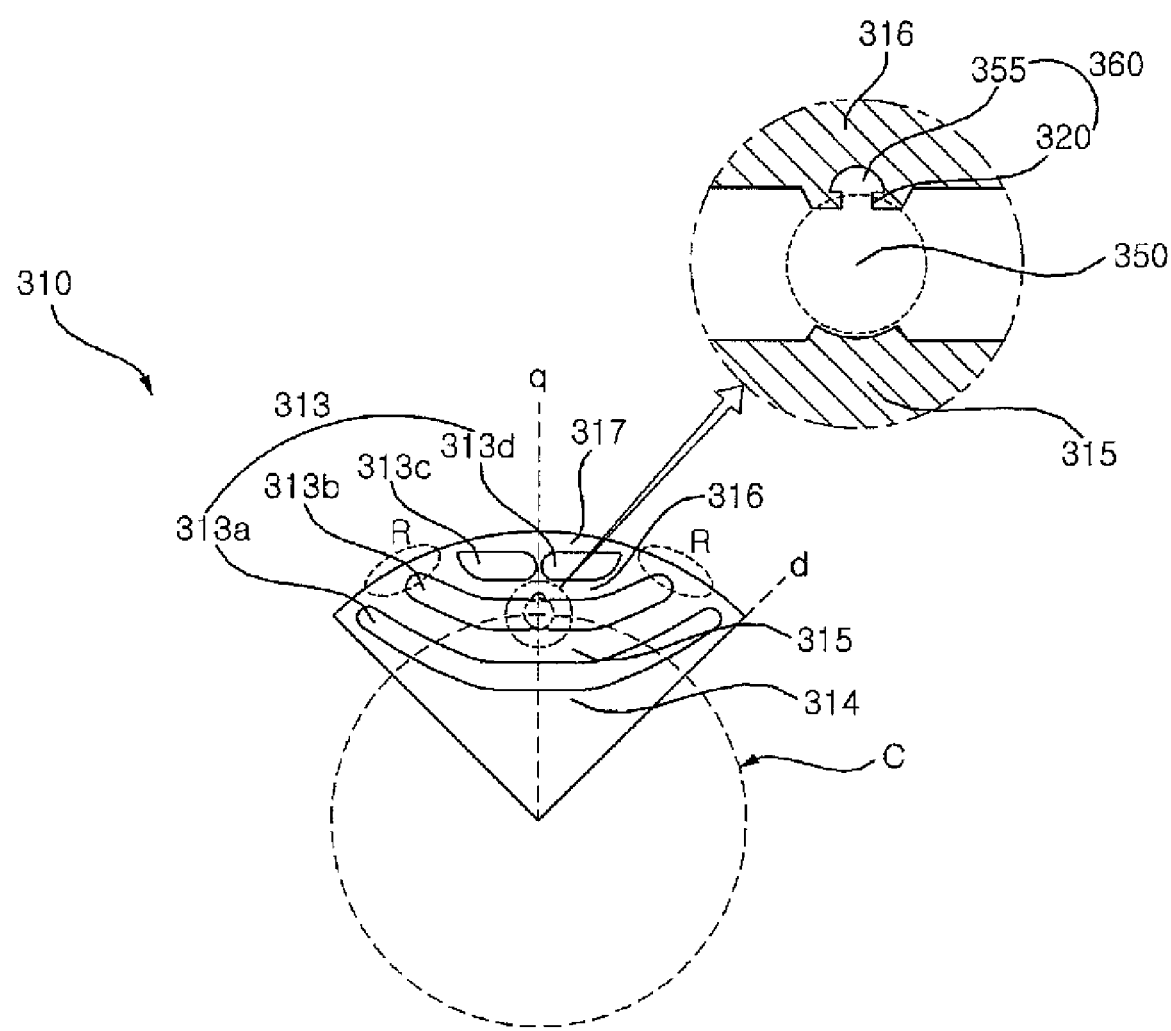
FIG. 7 is a plan view of a rotor of a synchronous reluctance motor in another implementation.

FIG. 7 is a plan view of a rotor of a synchronous reluctance motor in another implementation.

Referring to FIG. 7, in the synchronous reluctance motor, reinforcement may be provided in the form of a connection part 360 which couples a fixing member 350 with steel part 316.

The fixing member 350 is installed in the flux barrier 313b of the core 310. The connection part 360 may include a protrusion 355 and a groove 320. The protrusion 355 is formed to protrude from the fixing member 350. The groove 320 is formed at the steel part 316 to receive the protrusion 355. The protrusion and groove structure couples the fixing member 350 with the steel part 316. Since the fixing member 350 is coupled to the end plates, for example, end plates 120 and 130 in FIGS. 1 and 2, the fixing member 350 supports the steel part 316 against the centrifugal force when the core 310 rotates. Therefore, the deformation of the outer side of the core 310, specifically, the deformation of the outer rib (R) of the core 310 is reduced.

In the above implementations of the synchronous reluctance motor, the mechanical rigidity of a core is improved and the deformation of an outer side of the core is reduced because of the reinforcement structure, when a rotor is rotated at high speed.

Other implementations are within the scope of the following claims.

What is claimed is:

1. A synchronous reluctance motor comprising a core configured to rotate about a central axis and having first and second groups of flux barriers formed therein, each flux barrier being defined as an opening in the core, each of the first and second groups comprising a first flux barrier and a second flux barrier with the second flux barrier disposed outside the first flux barrier in a radial direction from the central axis of the core, and each of the second flux barriers of the first and second groups having at least two connection parts crossing the opening of the second flux barrier.

2. The synchronous reluctance motor of claim 1, wherein each of the connection parts has a width of 0.3 mm to 0.7 mm.

3. The synchronous reluctance motor of claim 1, wherein the core is made of steel.

4. The synchronous reluctance motor of claim 1, further comprising:
    an end plate disposed at one end of the core; and
    a fixing member passing through one of the second flux barriers and mechanically coupled to the end plate.

5. The synchronous reluctance motor of claim 4, wherein the connection parts in the second flux barrier through which the fixing member passes are symmetrically disposed with respect to the fixing member.

6. The synchronous reluctance motor of claim 4, wherein a distance between one of the connection parts and the central axis of the core is greater than a distance between the fixing member and the central axis of the core.

7. The synchronous reluctance motor of claim 4, wherein the fixing member is a rivet.

* * * * *